(12) United States Patent
Nagasaka et al.

(10) Patent No.: US 6,341,168 B1
(45) Date of Patent: *Jan. 22, 2002

(54) METHOD AND APPARATUS FOR DETECTING AND DISPLAYING A REPRESENTATIVE IMAGE OF A SHOT OF SHORT DURATION IN A MOVING IMAGE

(75) Inventors: Akio Nagasaka, Kokubunji; Takafumi Miyatake, Hachioji; Takehiro Fujita, Kokubunji; Katsumi Taniguchi, Hachioji; Kazuaki Tanaka, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,188

(22) Filed: Apr. 6, 1999

Related U.S. Application Data

(63) Continuation of application No. 08/676,478, filed on Jul. 8, 1996, now Pat. No. 6,023,520.

(30) Foreign Application Priority Data

Jul. 6, 1995 (JP) .............................................. 7-170672

(51) Int. Cl.[7] .............................................. G06K 9/00
(52) U.S. Cl. ...................................... 382/107; 382/236
(58) Field of Search ................................ 382/236, 107, 382/103, 278; 348/190, 232, 700, 143, 154, 415.1, 416.1, 699; 340/541; 345/474; 352/129; 375/240.16; 356/23

(56) References Cited

U.S. PATENT DOCUMENTS

| | | | |
|---|---|---|---|
| 5,083,860 A | 1/1992 | Miyatake et al. | 352/129 |
| 5,089,887 A | 2/1992 | Robert et al. | 358/105 |
| 5,099,324 A | 3/1992 | Abe | 348/155 |
| 5,177,608 A | 1/1993 | Ohki et al. | 358/136 |
| 5,237,408 A | 8/1993 | Blum et al. | 348/154 |
| 5,455,561 A | 10/1995 | Brown | 340/541 |
| 5,465,115 A | 11/1995 | Conrad et al. | 348/155 |
| 5,487,172 A | 1/1996 | Hyatt | 395/800 |
| 5,493,345 A | 2/1996 | Ishikawa et al. | 348/700 |
| 5,521,841 A | 5/1996 | Arman et al. | 364/514 A |
| 5,586,202 A | 12/1996 | Ohki et al. | 382/23 |
| 5,625,410 A | 4/1997 | Washino et al. | 348/154 |
| 5,911,008 A | * 6/1999 | Niikura et al. | 382/236 |
| 5,933,534 A | * 8/1999 | Yoshimoto et al. | 382/236 |
| 5,953,439 A | * 9/1999 | Ishihara et al. | 382/107 |

OTHER PUBLICATIONS

Byte, "State of the Art: Byte's Video Workshop" by S. Diehl, May 1995.

* cited by examiner

*Primary Examiner*—Jayanti K. Patel
(74) *Attorney, Agent, or Firm*—Antonelli, Terry, Stout & Kraus, LLP

(57) ABSTRACT

A method and apparatus for displaying a representative image corresponding to a shot of a duration within a specified range included in a plurality of shots of a moving image. The moving image includes a plurality of successive frames each having an image and each shot includes a plurality of the successive frames. In the invention a plurality of shot change points are sequentially detected from the moving image. The shot change points represent points between a pair of frames where images of a preceding shot and images of a succeeding shot have changed. Thereafter a detection is performed to determine whether a duration of a shot between a preceding shot change point and a succeeding shot change point is within the specified range. A representative image corresponding to the shot having a duration within the specified range is displayed along with duration time information representing the duration of the shot. A reduced image from the shot can be displayed as the representative image and the number of detected shots having a duration within the specified range can be reduced according to preset conditions.

86 Claims, 5 Drawing Sheets

METHOD AND APPARATUS FOR DETECTING AND DISPLAYING A REPRESENTATIVE IMAGE OF A SHOT OF SHORT DURATION IN A MOVING IMAGE

CROSS REFERENCE TO RELATED APPLICATIONS

This is a continuation of application Ser. No. 08/676,478, filed Jul. 8, 1996 now U.S. Pat No. 6,023,520; which is related to application Ser. No. 08/323,866, filed Oct. 17, 1994 and application Ser. No. 08/604,606, filed Feb. 21, 1996.

This application is related to application Ser. No. 08/323, 866, filed Oct. 17, 1994 and application Ser. No. 08/604,606, filed Feb. 21, 1996, the disclosures of each being incorporated herein by reference.

BACKGROUND OF THE INVENTION

The present invention relates to inspecting the quality of moving images such as videos or motion pictures. More particularly, the present invention relates to a method and apparatus for detecting a shot of short time duration inserted in a moving image stored on video tape or a video disc, and displaying a representative image of the shot of short time duration.

Due to the popularity of satellite broadcasting, cable television and the like, in addition to existing television broadcasting, the number of broadcasting channels have steadily increased. If a wide-band communications infrastructure called an "Information Highway" is established in the future, broadcasting will be easy to carry out. Thus, far more industrialists will take part in the broadcasting industry than do today further accelerating the increase in the number of broadcasting channels. With such a large amount of information being broadcasted it is possible that some of the information may contain illegal images which are intended to manipulate people. For example, there is a known phenomena called "Subliminal Suggestion" which is intended for illegal psychological manipulation of an audience. Subliminal suggestion is accomplished by inserting special images of extremely short time duration into a moving image. It is thought that subliminal suggestion is capable of subconsciously influencing an audience to perform a suggested act without the audience being aware that such a suggestion has occurred. For this reason, it is necessary to determine whether each program to be broadcast contains subliminal suggestion information and prevent broadcasting of such program. However, according to conventional technology, it is necessary to manually inspect a moving image while feeding it on a frame-by-frame basis. Thus, even if the moving image can be inspected at a rate of one frame per second, at least 48 hours would be required to inspect an entire 2-hour motion picture. As a result, it is physically impossible to inspect every program to be broadcast.

SUMMARY OF THE INVENTION

An object of the present invention is to provide a method and apparatus for detecting a shot of short time duration inserted in a moving image stored on video tape or a video disc and displaying a representation image of the shot.

To achieve the above object, the present invention provides input apparatus for inputting a moving image as a target sequentially in time on a frame-by-frame basis (one frame is one still image which constitutes part of a moving image, and generally televisions are arranged to display 30 frames per second), a shot change point detector for sequentially detecting from the moving image a plurality of shot change points representing points between a pair of frames where images of a preceding shot and images of a succeeding shot have changed, a shot duration detector for detecting a time duration of a shot between a time of a preceding shot change point (hereinafter referred to as the first time instant) and a time of a succeeding shot change point (hereinafter referred to as the second time instant), and apparatus for displaying a representative image of the shot and the time duration of the shot, if the duration time of the shot between the first and second time instants is shorter than a set time period. The time of occurrence of the shot can also be displayed with the representative image and time duration thereof.

There are also provided apparatus for displaying the representative image in the form of a list and apparatus for displaying the list so as to be indicative of the time duration of the shot corresponding to the representative image. Thus, the time duration of the shot represented by the representative image can be easily checked by viewing.

Further provided is apparatus for storing the first or any one,of the frames of the shot as the representative image when the duration of the shot is being detected by the shot duration detector. The stored frame may be later retrieved as the representative image when the duration of the shot is shorter than the set time, period. Also provided is apparatus for reducing the stored frame, retrieving the reduced frame as the representative image when the duration of the shot is shorter then the set time, and displaying the reduced frame as an icon representative of the shot of short time duration.

According to the present invention, it is possible to automatically detect a shot of short time duration without relying on human labor, thereby making it possible to automatically detect a picture portion in which an illegal image may be inserted. Since it is similarly possible to detect a meaningless shot of short duration which has been erroneously inserted during editing, it is also possible to improve the quality control of broadcast programs by detecting low quality short duration frames and deleting them the same as illegal images.

In the present invention the number of detected shots of short time duration to be inspected by a user can be reduced according to two conditions. The first condition is whether a plurality of shots of short duration have been successively detected at intervals of a duration shorter than a specified duration. The second condition is whether a shot of short time duration has been detected within a short period of time after detection of a previous shot of short time duration and whether the image of the detected shot of short time duration is similar to the image of the previously detected shot of short time duration.

If the first condition is satisfied all of the detected shots of short time duration are grouped together in a group with a single representative image. If the second condition is satisfied the detected shot of short time duration is added to the group containing the previously detected shot of short time duration.

In the present invention a representative image of a group of detected shots of short time duration is displayed in such a manner to indicate that it represents a group of detected shots of short time duration. Selection by the user of such a representative image causes the hierarchical display of the representative image of the group and representative images of all of the detected shots of short time duration that make up the group. Selection of any of the representative images of the detected shots of short time duration that make up the group allows the user to individually inspect the images of the detected shots of short time duration that make up the group.

Thus, by use of the present invention since representative images corresponding to a detected doubtful picture portion which may be illegal are displayed in the form of a list, the detected doubtful picture portion can readily be checked. If there is an error in the picture portion, the user can quickly check the picture portion while viewing it with his/her own eyes.

Further, since time information indicating the duration and when such a picture portion was detected is also displayed together with the corresponding representative image, it is possible to readily know not only the position of the picture portion in the entire picture but also the time duration of the picture portion, variations in the distribution of the picture portion with time, and the like.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENT

An embodiment of the present invention will be described below in detail in reference to FIGS. 1–9.

Figure 1:
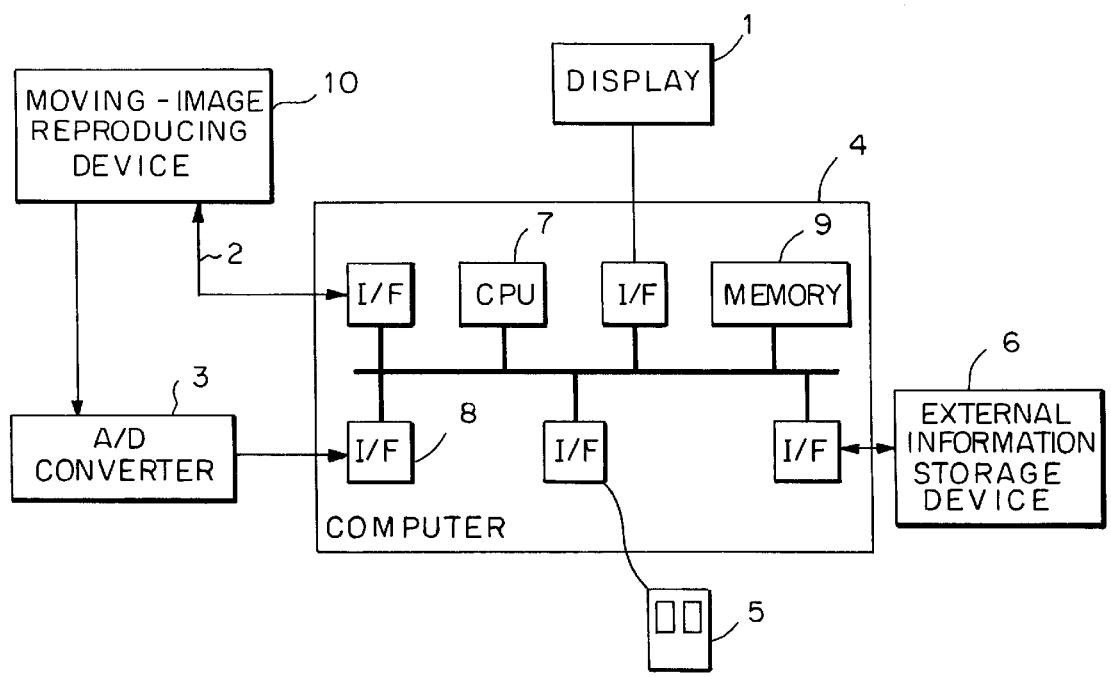
FIG. 1 is a block diagram of an embodiment of the present invention.

FIG. 1 is one example of a schematic block diagram of a system construction for realizing the present invention. Reference numeral 1 denotes a display device such as a CRT for displaying an output image from a computer 4. Instructions can be given to the computer 4 through an input device such as a keyboard or a pointing device. A moving-image reproducing device 10 is a tuner for receiving broadcast programs from ground-wave broadcasting, satellite broadcasting, cable television or the like, or a device for reproducing a moving-image recorded on an optical disc, video tape or the like. A video signal outputted from the moving-image reproducing device 10 is sequentially converted into digital image data by an A/D converter 3, and the digital image data is sent to the computer 4. In the computer 4, the digital image data is stored in a memory 9 via an interface 8, and is processed by a CPU 7 in accordance with a program stored in the memory 9.

The interface 8 can be a video capture board such as the FPS 60 video capture board produced by Fast Electronic U.S., Inc. or the video capture boards described in "Byte's Video Workshop", by S. Diehl, Byte, May 1995, pp. 97–104, if the moving-image reproducing device 10 is a standard analog video tape player. However, such a video capture board is not necessary if the moving-image reproducing device 10 is a digital video player. Also the A/D converter 3 would not be necessary. If individual frames of the moving image handled by the moving-image reproducing device 10 are respectively assigned numbers (frame numbers) in ascending order from the leading frame of the moving image, a moving image corresponding to a particular scene can be called and reproduced by sending the corresponding frame number to the moving-image reproducing device. Various kinds of information may also be stored in an external information storage device 6, if needed for processing. Various kinds of data which are prepared by processing to be described below are stored in the memory 9, and are referred to, as required.

Figure 2:
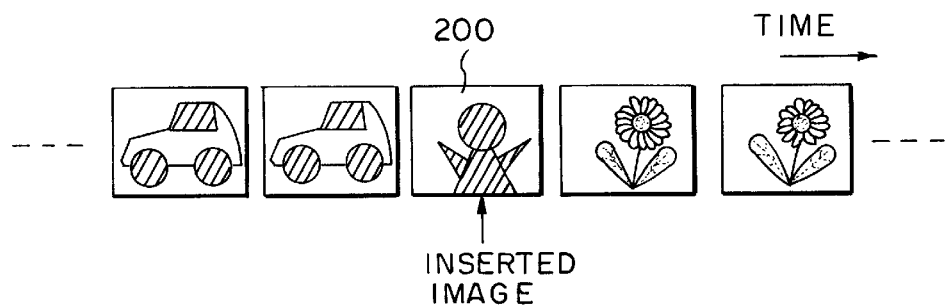
FIG. 2 is a view illustrating the concept of illegal image insertion.

FIG. 2 is a schematic view of frame images which are ordered in time in a portion of the moving image in which a typical subliminal image is inserted. A frame image 200 is the inserted image. Since shot change points are present before and after the frame image 200, the frame image 200 can be regarded as a shot having a shot time duration of one frame. The following is a detailed description of a method of detecting a shot having such a short time duration.

Figure 3:
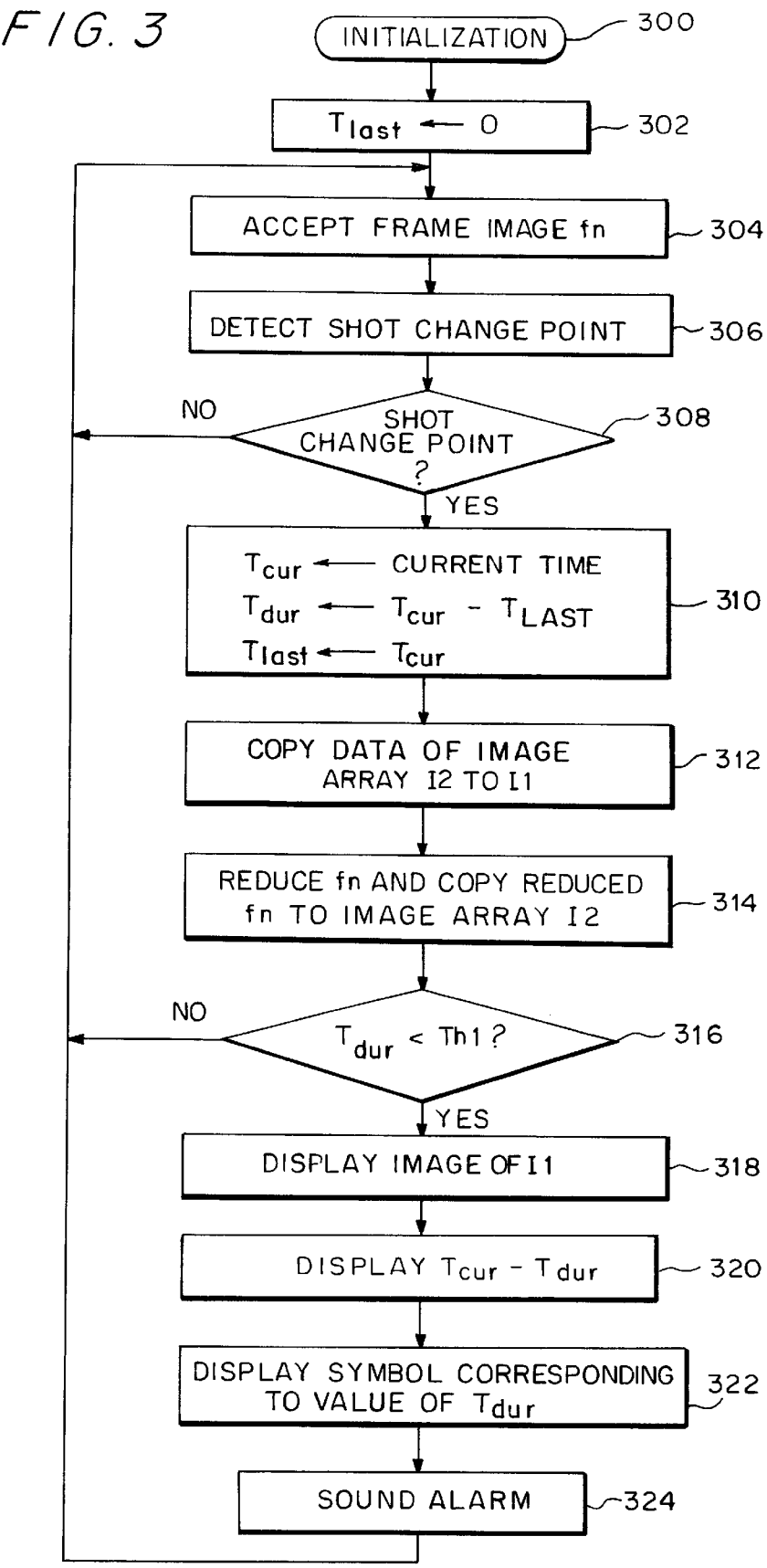
FIG. 3 is a flowchart of a computer program for detecting a shot of short time duration.

FIG. 3 is one example of a flowchart of a short-time shot detecting computer program which is executed by the computer 4 shown in FIG. 1. The program is stored in the memory 9. First of all, as initializing processing, the CPU 7 sets the various kinds of variables required for execution of the program to initial values (step 300). The initializing processing also includes the initialization of a time $T_{last}$ of the previous shot change point (step 302). Next the CPU 7 accepts a frame image fn which is outputted from the moving-image reproducing device 10 (step 304). Thereafter, the CPU 7 determines whether there is a shot change point between the frame image fn and the previous frame fn−1 (step 306).

As a method of detecting such a shot change point, it is possible to use, for example, the method disclosed in "AUTOMATIC INDEXING METHOD AND OBJECT SEARCHING METHOD FOR COLOR PICTURE," Journal of Information Processing Society of Japan, Vol. 33, No. 4, the method disclosed in Japanese Patent Laid-Open No. 111181/1992 which corresponds to U.S. Pat. No. 5,083,860 or the method disclosed in application Ser. No. 08/604,606, filed Feb. 21, 1996. In Japanese Patent Laid-Open No. 111181/1992, basically, if a significant difference in image between two successive frames is observed in a picture, it is determined that there is a shot change point between the two frames.

If it is not determined that there is a shot change point, the process returns to step 304, in which the frame image is accepted (step 308). If it is determined that there is a shot change point, the value of $T_{cur}$ is replaced with the current time, and the difference between the value of $T_{cur}$ and the time $T_{last}$ of the previous shot change point is calculated to obtain a time duration $T_{dur}$ of the shot. Then, the value of $T_{last}$ is replaced with the value of $T_{cur}$ to prepare for the next time where steps 304–308 are performed (step 310).

The time of the shot change point may be the time of a clock, or may also be a frame number or a time code indicative of the position of a shot change point on tape. In this case, at the same time that a shot change point is detected, the CPU 7 obtains the corresponding frame number or time code of the moving-image reproducing device 10. Of course, in a case where LTC or VITC time code is used, data which is sent via a signal line in synchronism with a frame image may be read. Then, the contents of a two-dimensional array I2 is copied to a two-dimensional array I1 for storing an icon image to be used as a representative image (step 312). After that, the frame image fn is reduced, as required, and copied to the array I2 (step 314).

Since the time period required for this copy processing is considerably long, the arrays I1 and I2 may be managed with address pointers relative to their respective data areas, and the process of step 312 may also replaced with the processing of merely exchanging the address pointers. Then, it is determined whether the previously obtained time duration $T_{dur}$ is smaller than a threshold Th1 (step 316). If the value of $T_{dur}$ is greater than the threshold Th1, the process returns to Step 304. If the value of $T_{dur}$ is smaller than the threshold Th1, the icon image which has been stored in the array I1 as the representative image is displayed on the display device 1 (step 318).

The time duration of each shot is identified after the shot has been switched to the next shot, with the result that if a representative image is accepted when the time duration of a particular shot is identified, an image corresponding to another shot will be accepted. However, by storing a representative image corresponding to the previous shot change point in the above-described manner, it is possible to accurately capture a representative image of a shot of short time duration. In addition, the time obtained by subtracting the value of $T_{dur}$ from the value of $T_{cur}$ is displayed together as the start time of the shot (step 320). Further, the value of $T_{dur}$ itself or, as will be described later, a symbol which varies according to the value is simultaneously displayed (step 322). Those representative images, the value of $T_{cur}-T_{dur}$ and the value of $T_{dur}$ are stored in the memory 9 of the computer 4 or the external storage device 6 so that they are referred to, as in the case of a list display. Finally, an alarm is sounded to warn a user of the presence of the short time direction shot, as required (step 324). Then, the process returns to Step 304 to repeat the above-described processings.

Figure 4:
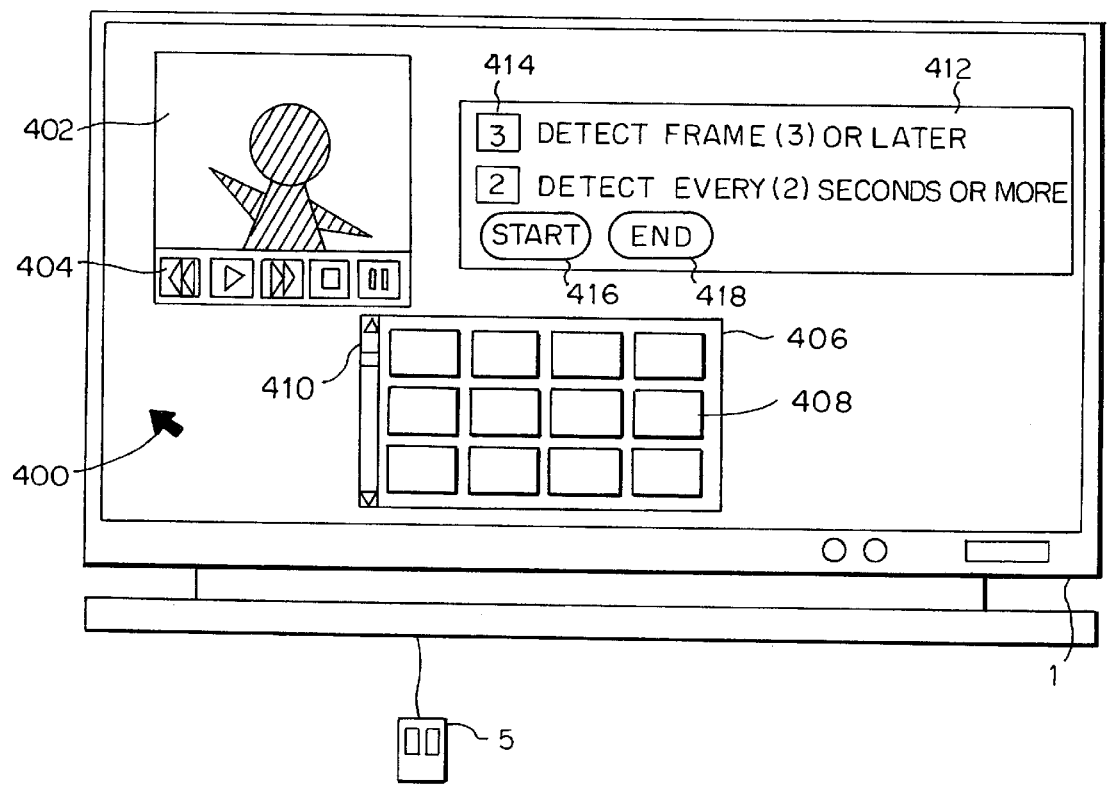
FIG. 4 is an example of an interface screen for detecting a shot of short time duration.

FIG. 4 shows one example of a display screen of the system which executes the program shown in FIG. 3. The display screen can be generated using a multi-window function such as that provided by the WINDOWS operating system. Reference numeral 400 denotes a cursor which can be made to point to an arbitrary position on the screen by use of a pointing device 5 such as a mouse. However, the cursor 400 is not needed if an arbitrary point can be directly pointed to by using a touch panel or other such devices. Reference numeral 402 denotes a preview screen of a picture. Reference numeral 404 denotes a control panel on which buttons similar to those of video tape recorder (VTR) are arranged, and by pointing to any of the buttons on the control panel 404, a control instruction such as PLAYBACK or FAST FORWARD FEED can be sent to the moving-image reproducing device 10 connected to the computer 4.

A reproduced picture can be checked through the preview screen 402. Reference numeral 406 denotes a screen area for displaying, in the form of a list, icons 408 indicative of representative images which respectively correspond to detected shots of short time duration. If a multiplicity of icons are to be displayed, any of them, which are out of the screen area 406, may be displayed by pointing to a scroll bar 410. Since a scroll interface itself is a well known interface of "Windows" of Microsoft Corp. and the "Macintosh Computer" of Apple Computers, no detailed description is given herein.

If any of the icons 408 is pointed to, the moving-image reproducing device 10 is controlled to cue and retrieve a shot which corresponds to the pointed to icon. The cueing is performed based on the information (the above-described value of $T_{cur}-T_{dur}$) indicative of the start time of the shot. Once the shot has been cued and retrieved the video contents of the shot can be checked on the preview screen 402 or a monitor directly connected to the moving-image reproducing device. In addition, by pointing to and selecting an arbitrary icon from among displayed icons and setting the selected icon to a nondisplay state, it is also possible to eliminate an erroneously detected icon from the list display.

Reference numeral 412 denotes a panel for setting the threshold shown in FIG. 3 as well as that used in a computer program which will be described below.

The threshold Th1 of FIG. 3 is displayed in an area 414. The area 414 is an interface which serves both a number inputting function and a number displaying function. If the area 414 is pointed to with the cursor 400, the area 414 is changed to a mode for accepting a number input, so that the value of the threshold th1 can be changed by using an input device such as a keyboard. Reference numeral 416 denotes a start button. If the start button 416 is pointed to, processing for detecting a shot of short time duration is started. Reference numeral 418 denotes an end button. If the end button 418 is pointed to, the detecting processing is brought to an end.

Figure 5:
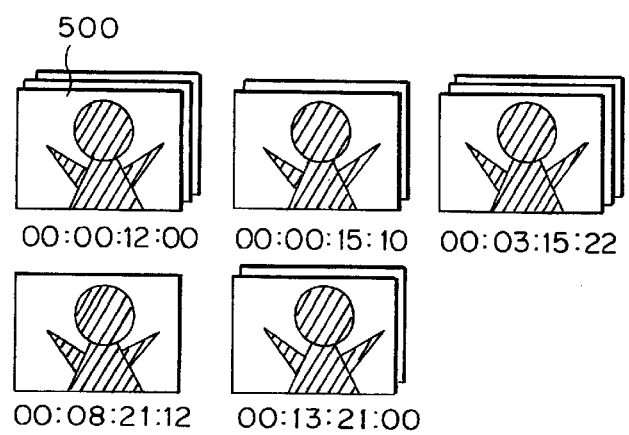
FIG. 5 is a view illustrating an example of the procedure of displaying a detected shot of short time duration in the form of a list.

FIG. 5 illustrates in detail a process of displaying, in the form of a list, representative images in the screen area 406 shown in FIG. 4. Reference numeral 500 denotes an icon of a representative image corresponding to a detected shot of short time duration. The start time of the shot is displayed together below the icon 500. In addition, as shown, the icon 500 is displayed as if several icons were stacked one on top of another, to represent the time duration of the shot. Thus, the number of stacked icons represent the time duration of the shot, thereby making it possible for a user to readily understand how long the shot lasts. The icon 500 also may be represented as a three-dimensional rectangular parallelepiped having a front face which displays the representative image, and the time duration of the shot may be represented as the thickness of the rectangular parallelepiped in the depth direction thereof.

Figure 6:
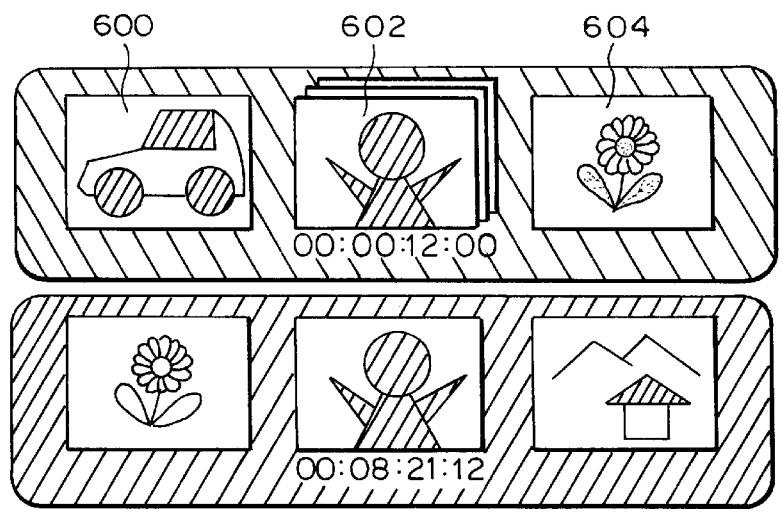
FIG. 6 is a view illustrating another example of the procedure of displaying a detected shot of short time duration in the form of a list.

FIG. 6 illustrates in detail another technique for displaying representative images in the form of a list. Reference numeral 602 denotes an icon of a list of icons of representative images corresponding to detected shots of short time duration. The next and previous shots or frames represented by icons 600 and 604, respectively, are displayed together on opposite sides of the icon 602. This technique can be realized by displaying the stored three representative images in a side-by-side manner, and by modifying the algorithm of FIG. 3 so that the number of representative images to be stored is increased by one. Increasing the number of representative images to be stored by one causes the storage of a representative image corresponding to the past shot change point. These three representative images are displayed as one set in the screen area 406 shown in FIG. 4. At this time, a plurality of representative images may be displayed in indented rows each containing one set of three representative images, or three representative images for each row may be displayed on the same background color, so that three representative images can be identified as one set.

The above-described procedure implemented by the computer program when executed, the flowchart of which is illustrated in FIG. 3, finds its greatest use in detecting a shot of short time duration by detecting a shot change point preceding the shot of short time duration and a shot change point succeeding the shot of short time duration. However, the technique of detecting shot change points using the above-described procedure has a tendency of detecting as a shot change point any points in the moving image wherein a difference between frames is high. Such a high difference between frames can occur, for example, in a part of a moving image having a quick change such as "dissolve" frames or "fade in/out" frames. When such a quick change part occurs in the moving image, the above-described procedure erroneously detects that a plurality of shot change points have occurred. Using these erroneously detected continuously occurring shot change points, numerous shots of short duration are detected. Thus, the above-described procedure may detect an excessive amount of shots of short time duration with a good number of them being erroneous detections.

In the above-described technique it is also possible to detect a shot of short time duration corresponding to frames of poor picture quality and display representative images of the frames of poor quality along with representative images of frames containing subliminal suggestion information. Frames of poor picture quality can be detected since high differences between frames corresponding to shot changes points exist in a moving image having frames of poor picture quality. Representative images corresponding to the frames of poor picture quality can be displayed in the form of a list. Thereafter the user can quickly review each of the representative images in the list and determine whether the representative image corresponds to frames of poor picture quality or whether the representative images corresponds to frames containing subliminal suggestion information. Thus, frames of poor picture quality can be deleted from the moving image along with frames containing subliminal suggestion information if desired.

Reviewing an excessive number of detected shots of short time duration and determining whether each of the shots contain subliminal suggestion information can be time consuming and tedious for a user. This is particularly true when the detected shots of short time duration are placed in the form of a list as illustrated in FIG. 6 for viewing later by the user.

In order to address the above situation, the present invention provides an embodiment in which a hierarchical display of several detected shots of short time duration are set forth in a set which is organized and displayed on a particular region of the display. Organizing several detected shots of short time duration into a hierarchical format with a single representative image as one set reduces the number of representative images being displayed on the display screen.

The present invention provides a procedure for reducing the number of detected and displayed shots of short time duration where such detected shots of short time duration may correspond to quick change parts such as "dissolve" and "fade in/out" frames, frames of poor picture quality or other such information not corresponding to subliminal suggestion information. By reducing the display of detected shots of short time duration the tediousness and time consuming aspects of the review by the user of each of the detected shots can be reduced.

The present invention accomplishes this by grouping detected shots of short time duration into a single group according to two conditions. The first condition is whether the detected shots of short time duration occur repeatedly within a very short time. The second condition is whether a detected shot of short time duration occurs a short time after a previously detected shot of short time duration, for example the last shot of the previously formed group, and the frames of both shots contain similar information.

Detected shots of short time duration that occur repeatedly within a very short time in most cases are an excessively detected shot of short time duration. In other words, each of the detected shots of short time duration which occur within a short period of time may have occurred due to, for example, frames of poor picture quality or frames where there is a quick change such as a "dissolve" scene or a "fade in/out" scene. Thus, grouping all of the detected shots of short time duration that occur within a very short period of time into a single group causes a single representative image to be displayed in the list of representative images of detected shots of short time duration.

Accordingly, the user need not review representative images of each of the detected shots of short time duration which occur within a short period of time since a single representative image of all of the shots are included in the list. However, the display of the representative image of the detected shots of short time duration which occur within a very short period of time may be displayed in a hierarchical form to allow the user to individually review each of the detected shots of short time duration at a later time as per FIG. 7.

A detected shot of short time duration that occurs a very short time after another previously detected shot of short time duration of a group and the frame of the shot has image information similar to the image information contained in a frame of the previously detected shot of short time duration is a delayed detected shot of short time duration that belong to the group of shots containing the previously detected shot of short time duration. In other words, the delayed detected shot of short time duration which occurs within a short period of time from the last detected shot of a plurality of shots of short time duration that have been grouped according to the above-described first condition, belong to such group if the frame of the detected shot of short time duration has image information similar to the image information of the frame previously detected shot of short time duration. Thus, the detected shot of short time duration that occur a very short time after another previously detected shot of short time duration and have image information similar to the image information contained in the previously detected shot of short time duration is added to the group containing the previously detected shot of short time duration.

Accordingly the user need not review the detected shot of short time duration that occurs a very short period of time after another previously detected shot of short time duration and has image information similar to the image information contained in the previously detected shot of short time duration. Since the delayed detected shot of short time duration is added to the group of the detected shots of short time duration containing the previously detected shot of short time duration the user is only required to review the representative image of the group of detected shots of short time duration to which the delayed detected shot of short time duration has been added. As described above, such representative image can be displayed in a hierarchial form to allow the user to individually review each of the detected shots of short time duration contained in the group represented by the representative image at a later time as shown in FIG. 7.

Figure 7:
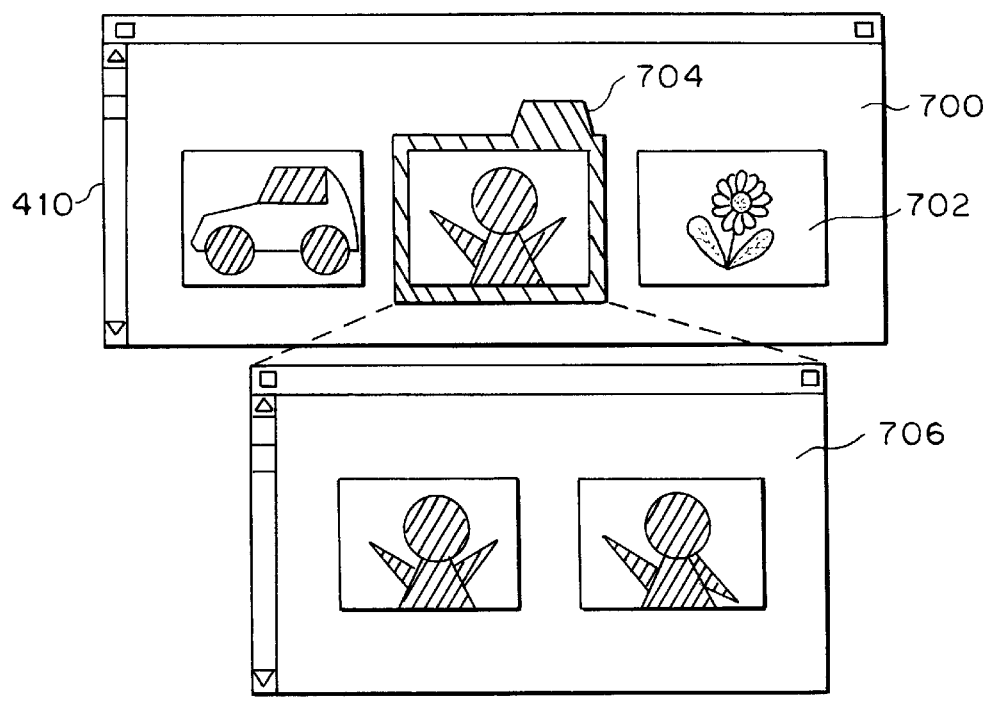
FIG. 7 is a view illustrating an example of the procedure of displaying a group of detected shots of short time duration in the form of a hierarchical list.

As described above, the hierarchical form used for checking the representative images is illustrated in FIG. 7. In FIG. 7 a window 700 that displays the list of representative images corresponding to the detected shots of short time duration. 410 is a scrolling bar. The scrolling bar is used to scroll through a large number of representative images that cannot be displayed in a single display. 702 is an icon of the representative image of a detected shot of short time duration that has been detected after the detection of a plurality of detected shots of short time duration that have been grouped into a single group represented by an icon 704 according to the above-described first and second conditions.

It is shown that two or more detected shots of short time duration make one group which is represented using icon 704. When the user selects icon 704 in the list display window 700 a window 706 that displays the detected shots of short time duration that make up the group appears.

The details of the operation to be performed to open a window is not described herein since such operation is well known due to the widespread use of the Windows operating system of Microsoft and the operating systems of the MacIntosh Computer of Apple Computers.

Figure 8:
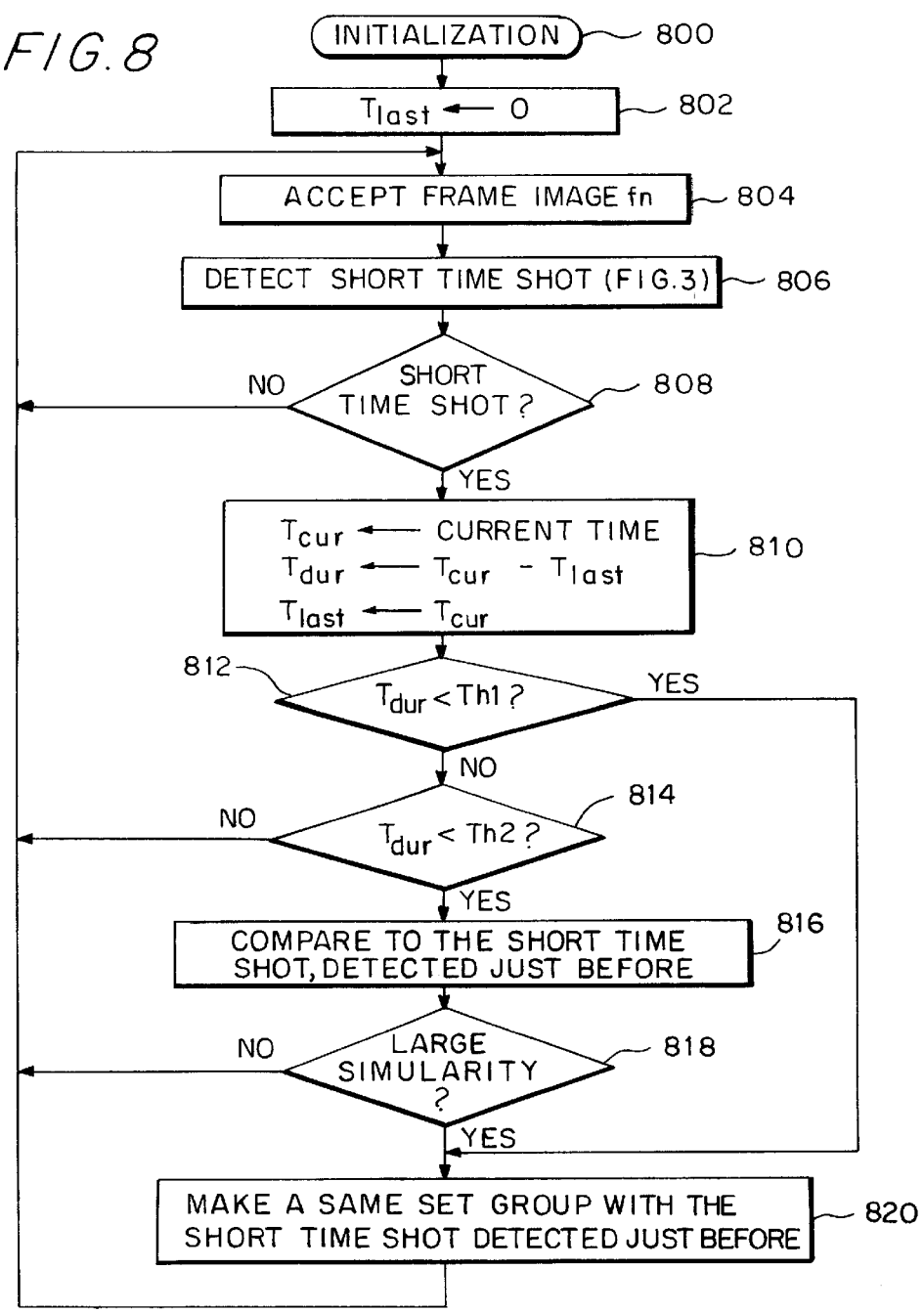
FIG. 8 is a flowchart of a computer program for detecting shots of short time duration according to two conditions.

The flowchart of the computer program that groups a plurality of shots of short time duration to a single group according to the above-described first and second conditions is illustrated in FIG. 8. The computer program corresponding to the flowchart illustrated in FIG. 8 is stored in memory 9.

The computer program when executed causes the computer 4 to operate as follows. First the CPU 7 sets various variables to initial values that are first necessary for execution of a program as an initialization process. (step 800). After the initialization process (step 800), initialization of the time just before shot change point ($T_{last}$) is performed (step 802). Then frame image (fn) outputted from a moving-image reproducing device 10 is accepted (step 804). Thereafter, a detection is performed to determine whether the frame is part of a shot of short time duration according to an already explained algorithm (step 806).

When the frame is judged not to be a part of a shot of short time duration, the processing proceeds back to step 804 where a new frame is accepted (step 808). When the frame is judged to be part of a shot of short time duration, (step 808), the processing proceeds forward to (step 810).

In step 810 the following substeps are performed:
(1) The present time is substituted for "$T_{cur}$";
(2) The time "$T_{last}$" of the time just before a shot of short time duration is detected is subtracted from the time "$T_{cur}$" in order to obtain the time "$T_{dur}$" indicative of the length of time since the last detected shot of short time duration;.and
(3) "$T_{cur}$" is substituted for "$T_{last}$".

The values for the times described above can be provided by a clock, frame numbers that represent positions on the tape of a detected shot of short time duration or a time code. If frame numbers or time codes are used, the moving-image reproducing device 10 must be accessed for such data. If a time code in the form that is known as "VITC" and "LTC" is used, data corresponding to such code is read from the data that is sent in the signal line synchronizing with a frame.

The above-described first condition is satisfied, if it is determined that "$T_{dur}$" is shorter than a predetermined threshold "Th1" (step 812) causing the detected shot of short time duration to be added to the same group as the previously detected shot of short time duration (step 820). The best results for the first condition seem to occur when "Th1" is set to a value of approximately 500 milliseconds.

If the first condition is not satisfied a test for the second condition is conducted. The second condition is satisfied if it is determined that a predetermined threshold "Th2" is larger than "$T_{dur}$" (step 814) and it is determined by comparison of the detected shot of short time duration to the previously detected shot of short time duration, that the detected shots of short time duration resemble or are similar to the previously detected shot of short time duration (step 816) and the similarity is large (step 818). If the detected shot of short time duration and the previously detected shot of short time duration resemble each and the similarity is large the detected shot of short time duration is added to the same group as the previously detected shot of short time duration (step 820). If the second condition is not satisfied the processing proceeds back to step 804. The best results for the second condition seem to occur when "Th2" is set to a value of approximately 5 seconds.

Figure 9:
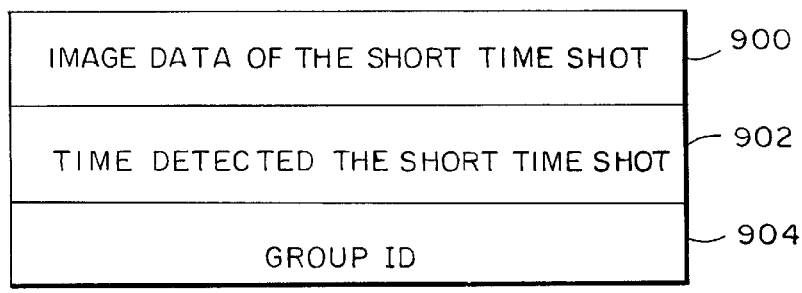
FIG. 9 is a schematic diagram illustrating the structure of a storage area containing data of a group of detected shots of short time duration.

During the execution of the above-described computer program, the image of the detected shots of short time duration of each group, the detection times of the detected shots of short time duration of the group and a group identification (ID) corresponding to the group are stored in a particular structure, in a storage area of memory 9 or external storage memory 6 in a manner illustrated in FIG. 9. FIG. 9 illustrates the structure of the storage area including image data of the shots of short time duration grouped into a single group 900, detection times of the detected shots of short time duration of the group 902 and a group ID 906 for the group.

When a list is displayed on the screen, the image of a shot of short time duration and the detection time of the shot are read from memory 9 or external storage device 6. In step 820 data of the detected shot of short time duration is added to the group of the previously detected shot of short time duration according to the data contained in the storage area 900, 902, 904 and is stored in memory 9 or external storage device 6.

The group ID 904 makes use of a serial number corresponding to the detected shots of short time duration of the group. Thus, all detected shots of short time duration having a same serial number corresponding to the serial number of the group ID belong to the same group. Therefore, when a group of shots of short time duration having the same group ID is displayed on a screen, for example, a shot having the earliest detected time is displayed as a representative image of the group. Also a symbol as illustrated in FIG. 7, indicating that the representative image representative of a plurality of detected shots of short time duration of a single set is shown simultaneously. When step 820 is completed, processing returns to step 804, and the above-described processing is repeated.

While the invention has been described in detail and pictorially in the accompanying drawings it is not limited to such details since many changes and modifications recognizable to those of ordinary skill in the art may be made to the invention without departing from the spirit and the scope thereof.

We claim:
1. A method of displaying a representative image corresponding to a shot of a duration within a specified range included in a plurality of shots of a moving image, said moving image includes a plurality of successive frames each having an image, and each shot includes at least one frame, said method comprising the steps of:

sequentially detecting from said moving image a plurality of shot change points representing points between a pair of frames where images of a preceding shot and images of a succeeding shot have changed;

detecting whether a duration of a shot between a preceding shot change point and a succeeding shot change point is within the specified range; and displaying a representative image corresponding to said shot having a duration within the specified range.

2. A method according to claim 1, further comprising the steps of:

reducing an image corresponding to said shot having a duration within the specified range; and displaying the reduced image as said representative image.

3. A method according to claim 2, further comprising the step of:

displaying along with said representative image, frames preceding and succeeding said shot having a duration within the specified range.

4. A method according to claim 1, further comprising the step of:

sounding an alarm at the same time said representative image is displayed.

5. A method according to claim 1, further comprising the step of:

displaying along with said representative image, frames preceding and succeeding said shot having a duration within the specified range.

6. A method according to claim 1, wherein said representative image is displayed as a solid having a thickness according to the duration of said shot having a duration within the specified range.

7. A method according to claim 1, wherein said representative image is displayed in such a manner that a number of images are stacked in a manner where the images are shifted in position relative to one another according to the duration of said shot having a duration within the specified range.

8. A method according to claim 1, further comprising the step of:

displaying along with said representative image, start time information indicating the start time of said shot having a duration within the specified range.

9. A method according to claim 8, wherein said duration time information and start time information are provided by one of a clock, frame number or time code.

10. A method according to claim 1, wherein said displaying step is performed using a multi-window function.

11. A computer program stored on a computer readable medium for execution by a computer to cause said computer to display a representative image corresponding to a shot of a duration within a specified range included in a plurality of shots of a moving image, said moving image includes a plurality of successive frames each having an image, and each shot includes at least one frame, said computer program comprising:

a first code for causing said computer to sequentially detect from said moving image a plurality of shot change points representing points between a pair of frames where images of a preceding shot and images of a succeeding shot have changed;

a second code for causing said computer to detect whether a duration of a shot between a preceding shot change point and a succeeding shot change point is within the specified range; and a third code for causing said computer to display a representative image corresponding to said shot having a duration within the specified range.

12. A computer program according to claim 11, further comprising:

a fourth code for causing said computer to reduce an image corresponding to said shot having a duration within the specified range; and a fifth code for causing said computer to display the reduced image as said representative image.

13. A computer program according to claim 12, further comprising:

a sixth code for causing said computer to display, along with said representative image, frames preceding and succeeding said shot having a duration within the specified range.

14. A computer program according to claim 11, further comprising:

a fourth code for causing said computer to sound an alarm at the same time said representative image is displayed.

15. A computer program according to claim 11, further comprising:

a third code for causing said computer to display along with said representative image, frames preceding and succeeding said shot having a duration within the specified range.

16. A computer program according to claim 11, wherein said representative image is displayed as a solid having a thickness according to the duration of said shot having a duration within the specified range.

17. A computer program according to claim 11, wherein said representative image is displayed in such a manner that a number of images are stacked in a manner where the images are shifted in position relative to one another according to the duration of said shot having a duration within the specified range.

18. A computer program according to claim 11, further comprising:

fourth code for causing said computer to display along with said representative image, start time information indicating the start time of said shot having a duration within the specified range.

19. A computer program according to claim 18, wherein said duration time information and start time information are provided by one of a clock, frame number or time code.

20. A computer program according to claim 11, wherein said third code includes a multi-window function.

21. A display apparatus for displaying a representative image corresponding to a shot of a duration within a specified range included in a plurality of shots of a moving image, said moving image includes a plurality of successive frames each having an image, and each shot includes at least one frame, said apparatus comprising:

a display having a display screen for displaying images; and a processing apparatus for sequentially detecting from said moving image a plurality of shot change points representing points between a pair of frames where images of a preceding shot and images of a succeeding shot have changed, detecting whether a duration of a shot between a preceding shot change point and a succeeding shot change point is within the specified range, and displaying on said display screen a representative image corresponding to said shot having a duration within the specified range.

22. A display apparatus according to claim 21, wherein said processing apparatus reduces an image corresponding to said shot having a duration within the specified range, and displays the reduced image as said representative image.

23. A display apparatus according to claim 22, wherein said processing apparatus displays along with said representative image, frames preceding and succeeding said shot having a duration within the specified range.

24. A display apparatus according to claim 21, wherein said processing apparatus sounds an alarm at the same time said representative image is displayed.

25. A display apparatus according to claim 21, wherein said processing apparatus displays along with said representative image, frames preceding and succeeding said shot having a duration within the specified range.

26. A display apparatus according to claim 21, wherein said representative image is displayed as a solid having a thickness according to the duration of said shot having a duration within the specified range.

27. A display apparatus according to claim 21, wherein said representative image is displayed in such a manner that a number of images are stacked in a manner where the images are shifted in position relative to one another according to the duration of said shot having a duration within the specified range.

28. A display apparatus according to claim 21, wherein said processing apparatus displays, along with said representative image, start time information indicating the start time of said shot having a duration within the specified range.

29. A display apparatus according to claim 28, wherein said duration time information and start time information are provided by one of a clock, frame number or time code.

30. A display apparatus according to claim 21, wherein said displaying is performed using a multi-window function.

31. A computer program stored on a computer readable medium for execution by a computer to cause said computer to display a representative image of a moving image, said moving image includes a plurality of successive frames, and each shot of the moving image includes at least one frame, said computer program comprising:
- a first code for causing said computer to detect a part of a moving image having a quick change, said part of the moving image includes a plurality of shots, each shot having a duration within the specified range,
  - wherein each shot is defined by at least one frame disposed between a first shot change point and a second shot change point, and
  - wherein said shot change points represent points between a pair of frames where images of a preceding shot and images of a preceding shot have changed; and
- a second code for causing said computer to display a representative image corresponding to said group.

32. A computer program stored on a computer readable medium for execution by a computer to cause said computer to display a representative image of a moving image, said moving image includes a plurality of successive frames, and each shot of the moving image includes at least one frame, said computer program comprising:
- a first code for causing said computer to detect shots having a duration within the specified range that occur repeatedly within a predetermined time period of each other due to frames where there is a quick change,
  - wherein each of said shots are detected by detecting a first shot change point preceding said shot and a second shot change point succeeding said shot, and
  - wherein said shot change points represent points between a pair of frames where images of a preceding shot and images of a preceding shot have changed; and
- a second code for causing said computer to display a representative image corresponding to said group.

33. A computer program stored on a computer readable medium for execution by a computer to cause said computer to display a representative image of a moving image, said moving image includes a plurality of successive frames, and each shot of the moving image includes at least one frame, said computer program comprising:
- a first code for causing said computer to detect a part of a moving image, said part of the moving image includes a plurality of successive shots, each representative image of a pair of successive shots having a greater difference than a predetermined level,
  - wherein each of said shots are detected by detecting a first shot change point preceding said shot and a second shot change point succeeding said shot, and
  - wherein said shot change points represent points between a pair of frames where images of a preceding shot and images of a preceding shot have changed;
- a second code for causing said computer to store detecting times indicating the detected parts of the moving image; and
- a third code for causing said computer to display an image from the moving image according to the detecting time as a representative image of the moving image.

34. A method of detecting a representative image corresponding to a shot of a duration within a specified range included in a plurality of shots of a moving image, said moving image includes a plurality of successive frames each having an image, and each shot includes at least one frame, said method comprising the steps of:
- sequentially detecting from said moving image a plurality of shot change points representing points between a pair of frames where images of a preceding shot and images of a succeeding shot have changes;
- outputting whether a duration of a shot between a preceding shot change point and a succeeding shot change point is within the specified range; and
- displaying a representative image information on a display corresponding to said shot having a duration within the specified range.

35. A method of detecting a representative image corresponding to at least one shot of a duration within a specified range included in a plurality of shots of a moving image, said moving image includes a plurality of successive frames each having an image, and each shot includes at least one frame, said method comprising the steps of:
- sequentially detecting from said moving image a plurality of shot change points representing points between a pair of frames where images of a preceding shot and images of a succeeding shot having changed;
- detecting whether a duration of a shot between a preceding shot change point and succeeding shot change point is within a specified range;
- grouping shots having a duration within the specified range into a group when said shots having a duration within the specified range occur within a predetermined time period of each other;
- adding a subsequently detected shot having a duration within the specified range to said group containing a previously detected shot having a duration within the specified range when said subsequently detected shot has occurred within a predetermined time period of said previously detected shot and a frame of said subsequently detected shot contains information similar to information contained in a frame of said previously detected shot; and outputting representative image information corresponding to said group.

36. A computer program for execution by a computer to cause said computer to detect a representative image corresponding to a shot of a duration within a specified range included in a plurality of shots of a moving image, said moving image includes a plurality of successive frames each having an image, and each shot includes at least one frame, said computer program comprising:

a first code for causing said computer to sequentially detect from said moving image a plurality of shot change points representing points between a pair of frames where images of a preceding shot and images of a succeeding shot have changed;

a second code for causing said computer to detect whether a duration of a shot between a preceding shot change point a succeeding shot change point is within the specified range; and a third code for causing said computer to output representative image information corresponding to said shot having a duration within the specified range.

37. A computer program for executing by a computer to cause said computer to detect a representative image corresponding to at least one shot of a duration within a specified range included in a plurality of shots of a moving image, said moving image includes a plurality of successive frames each having an image, and each shot includes at least one frame, said computer program comprising:

a first code for causing said computer to sequentially detect from said moving image a plurality of shot change points representing points between a pair of frames where images of a preceding shot and images of a succeeding shot have changed;

a second code for causing said computer to detect whether a duration of a shot between a preceding shot change point and succeeding shot change point is within the specified range;

a third code for causing said computer to group shots having a duration within the specified range into a group when said shots having a duration within the specified range occur within a predetermined time period of each other;

a fourth code for causing said computer to add a subsequently detected shot having a duration within the specified range to said group containing a previously detected shot having a duration within the specified range when said subsequently detected shot has occurred within a predetermined time period of said previously detected shot and a frame of said subsequently detected shot contains information similar to information contained in a frame of said previously detected shot; and a fifth code for causing said computer to output representative image information corresponding to said group to display.

38. An information processing apparatus for detecting a representative image corresponding to a shot of a duration within a specified range included in a plurality of shots of a moving image, said moving image includes a plurality of successive frames each having an image, and each shot includes at least one frame, said apparatus comprising:

a processing apparatus for sequentially detecting from said moving image a plurality of shot change points representing points between a pair of frames where images of a preceding shot and images of a succeeding shot have changed, detecting whether a duration of a shot between a preceding shot change point and a succeeding shot change point is within the specified range, and outputting to an external display screen representative image information corresponding to said shot having a duration within the specified range.

39. A method of detecting a representative image corresponding to at least one shot of a duration within a specified range included in a plurality of shots of a moving image, said moving image includes a plurality of successive frames each having an image, and each shot includes at least one frame, said method comprising the steps of:

sequentially detecting from said moving image a plurality of shot change points representing points between a pair of frames where images of a preceding shot and images of a succeeding shot have changed;

detecting whether a duration of a shot between a preceding shot change point and a succeeding shot change point is within the specified range;

grouping shots having a duration within the specified range into a group when said shots having a duration within the specified range repeatedly occur within a predetermined period of time due to frames where there is a quick change; and outputting representative image information corresponding to said group.

40. A method of detecting a representative image of a moving image, said moving image includes a plurality of successive frames, and each shot of said moving image includes at least one frame, said method comprising the steps of:

detecting a part of a moving image, said part of said moving image includes a plurality of successive shots, each representative image of a pair of successive shots having more differences with each other than a predetermined level, wherein each of said shots are detected by detecting a first shot change point preceding said shot and a second shot change point succeeding said shot, and wherein said shot change points represent points between a pair of frames where images of a preceding shot and images of a preceding shot have changed;

storing detecting times corresponding to the detected parts of said moving image; and outputting an image from said moving image according to the detecting times as a representative image of said moving image.

41. A computer program for executing by a computer to cause said computer to detect a representative image corresponding to at least one shot of a duration within a specified range included in a plurality of shots of a moving image, said moving image includes a plurality of successive frames each having an image, and each shot includes at least one frame, said computer program comprising:

a first code for causing said computer to sequentially detect from said moving image a plurality of shot change points representing points between a pair of frames where images of a preceding shot and images of a succeeding shot have changes;

a second code for causing said computer to detect whether a duration of a shot between a preceding shot change point and a succeeding shot change point is within the specified range;

a third code for causing said computer to group shots having a duration within the specified range into a group when said shots having a duration within the specified range repeatedly occur within a predetermined period of time due to frames where there is a quick change; and a fourth code for causing said computer to output data indicating a representative image corresponding to said group.

42. A computer program for executing by a computer to cause said computer to detect a representative image corresponding to at least one shot of a duration within a specified range included in a plurality of shots of a moving image, said moving image includes a plurality of successive frames each having an image, and each shot includes at least one frame, said computer program comprising:

a first code for causing said computer to sequentially detect from said moving image a plurality of shot change points representing points between a pair of frames where images of a preceding shot and images of a succeeding shot have changes, each shot including at least one frame;

a second code for causing said computer to detect whether a duration of a shot between a preceding shot change point and a succeeding shot change point is within the specified range; and a third code for causing said computer to group shots having a duration within the specified range into a group when said shots having a duration within the specified range repeatedly occur within a predetermined period of time.

43. A computer program for executing by a computer to cause said computer to output a representative image of a moving image, said moving image includes a plurality of successive frames, and each shot of the moving image includes at least one frame, said computer program comprising:

a first code for causing said computer to detect a part of a moving image having a quick change, said part of the moving image includes a plurality of shots, each shot having a duration within the specified range,
wherein each of said shots are detected by detecting a first shot change point preceding said shot and a second shot change point succeeding said shot, and
wherein said shot change points represent points between a pair of frames where images of a preceding shot and images of a preceding shot have changed; and a second code for causing said computer to display a representative image corresponding to said group.

44. A computer program for executing by a computer to cause said computer to display a representative image of a moving image, said moving image includes a plurality of successive frames, and each shot of the moving image includes at least one frame, said computer program comprising:

a first code for causing said computer to detect shots having a duration within the specified range that occur repeatedly within a predetermined time period of each other due to frames where there is a quick change,
wherein each shot is defined by at least one frame disposed between a first shot change point and a second shot change point, and
wherein said shot change points represent points between a pair of frames where images of a preceding shot and images of a preceding shot have changed; and a second code for causing said computer to display a representative image corresponding to said group.

45. A computer program for executing by a computer to cause said computer to output a representative image of a moving image, said moving image includes a plurality of successive frames, and each shot of the moving image includes at least one frame, said computer program comprising:

a first code for causing said computer to detect a part of a moving image, said part of the moving image includes a plurality of successive shots, each representative image of a pair of successive shots having a greater difference than a predetermined level,
wherein each of said shots are detected by detecting a first shot change point preceding said shot and a second shot change point succeeding said shot, and
wherein said shot change points represent points between a pair of frames where images of a preceding shot and images of a preceding shot have changed;

a second code for causing said computer to store detecting times indicating the detected parts of the moving image; and a third code for causing said computer to output an image from the moving image according to the detecting times as a representative image of the moving image.

46. A method of displaying a representative image corresponding to at least one shot of a duration within a specified range included in a plurality of shots of a moving image, said moving image includes a plurality of successive frames each having an image, and each shot includes at least one frame, said method comprising the steps of:

sequentially detecting from said moving image a plurality of shot change points representing points between a pair of frames where images of a preceding shot and images of a succeeding shot have changed;

detecting whether a duration of a shot between a preceding shot change point and succeeding shot change point is within the specified range;

grouping shots having a duration within the specified range into a group when said shots having a duration within the specified range occur within a predetermined time period of each other;

adding a subsequently detected shot having a duration within the specified range to said group containing a previously detected shot having a duration within the specified range when said subsequently detected shot has occurred within a predetermined time period of said previously detected shot and a frame of said subsequently detected shot contains information similar to information contained in a frame of said previously detected shot; and displaying a representative image corresponding to said group.

47. A method according to claim 46, further comprising the steps of:

reducing an image corresponding to said group; and displaying the reduced image as said representative image of said group.

48. A method according to claim 46, further comprising the step of:

sounding an alarm at the same time said representative image is displayed.

49. A method according to claim 46, further comprising the step of:

displaying, along with said representative image, frames preceding and succeeding said group.

50. A method according to claim 46, further comprising the step of:
   displaying, along with said representative image, frames preceding and succeeding said group.

51. A method according to claim 46, wherein said representative image is displayed as a solid having a thickness according to the duration of the shots which make up said group.

52. A method according to claim 46, wherein said representative image is displayed in such a manner that a number of images are stacked in a manner where the images are shifted in position relative to one another according to duration of the shots which make up said group.

53. A method according to claim 46, further comprising the step of:
   displaying along with said representative image duration time information indicating the duration of the shots which make up said group and start time information indicating the start time of the shots which make up said group.

54. A method according to claim 53, wherein said duration time information and said start time information are provided by one of a clock, frame number or time code.

55. A method according to claim 46, wherein said displaying step is performed using a multi-window function.

56. A method according to claim 46, wherein said displaying step comprises the step of:
   displaying in a hierarchical form said representative image and images corresponding to the shots that make up said group.

57. A method according to claim 46, wherein an operator can inspect the contents of frames included in a shot of said group by selecting the image corresponding to said shot from the hierarchical form being displayed.

58. A computer program stored on a computer readable medium for execution by a computer to cause said computer to display a representative image corresponding to at least one shot of a duration within a specified range included in a plurality of shots of a moving image, said moving image includes a plurality of successive frames each having an image, and each shot includes at least one frame, said computer program comprising:
   a first code for causing said computer to sequentially detect from said moving image a plurality of shot change points representing points between a pair of frames where images of a preceding shot and images of a succeeding shot have changed;
   a second code for causing said computer to detect whether a duration of a shot between a preceding shot change point and succeeding shot change point is within the specified range;
   a third code for causing said computer to group shots having a duration within the specified range into a group when said shots having a duration within the specified range occur within a predetermined time period of each other;
   a fourth code for causing said computer to add a subsequently detected shot having a duration within the specified range to said group containing a previously detected shot having a duration within the specified range when said subsequently detected shot has occurred within a predetermined time period of said previously detected shot and a frame of said subsequently detected shot contains information similar to information contained in a frame of said previously detected shot; and
   a fifth code for causing said computer to display a representative image corresponding to said group.

59. A computer program according to claim 58, further comprising:
   a sixth code for causing said computer to reduce an image corresponding to said group; and
   a seventh code for causing said computer to display the reduced image as said representative image of said group.

60. A computer program according to claim 58, further comprising:
   a sixth code for causing said computer to sound an alarm at the same time said representative image is displayed.

61. A computer program according to claim 58, further comprising:
   a sixth code for causing said computer to display, along with said representative image, frames preceding and succeeding said group.

62. A computer program according to claim 58, further comprising:
   a sixth code for causing said computer to display, along with said representative image, frames preceding and succeeding said group.

63. A computer program according to claim 58, wherein said representative image is displayed as a solid having a thickness according to duration of the shots which make up said group.

64. A computer program according to claim 58, wherein said representative image is displayed in such a manner that a number of images are stacked in a manner where the images are shifted in position relative to one another according to duration of the shots which make up said group.

65. A computer program according to claim 58, further comprising:
   a sixth code for causing said computer to display along with said representative image duration time information indicating the duration of the shots which make up said group and start time information indicating the start time of the shots which make up said group.

66. A computer program according to claim 65, wherein said duration time information and said start time information are provided by one of a clock, frame number or time code.

67. A computer program according to claim 58, wherein said fifth code includes a multi-window function.

68. A computer program according to claim 58, wherein said fifth code comprises:
   a sixth code for causing said computer to display in a hierarchical form said representative image and images corresponding to the shots that make up said group.

69. A computer program according to claim 68, wherein an operator can inspect the contents of frames included in a shot of said group by selecting the image corresponding to said shot from the hierarchical form being displayed.

70. A display apparatus for displaying a representative image corresponding to at least one shot of a duration within a specified range included in a plurality of shots of a moving image, said moving image includes a plurality of successive frames each having an image, and each shot includes at least one frame, said apparatus comprising:
   a display having a display screen for displaying images; and
   a processing apparatus for sequentially detecting from said moving image a plurality of shot change points representing points between a pair of frames where images of a preceding shot and images of a succeeding shot have changed, detecting whether a duration of a shot between a preceding shot change point and succeeding shot change point is within the specified range, grouping shots having a duration within the specified range into a group when said shots having a duration within the specified range occur within a predetermined time period of each other, adding a subsequently detected shot having a duration within the specified range to said group containing a previously detected shot having a duration within the specified range when said subsequently detected shot has occurred within a predetermined time period of said previously detected shot and a frame of said subsequently detected shot contains information similar to information contained in a frame of said previously detected shot and displaying on said display screen a representative image corresponding to said group.

71. A display apparatus according to claim 70, wherein said processing apparatus reduces an image corresponding to said group, and displays the reduced image as said representative image of said group.

72. A display apparatus according to claim 70, wherein said processing apparatus sounds an alarm at the same time said representative image is displayed.

73. A display apparatus according to claim 70, wherein said processing apparatus displays along with said representative image, frames preceding and succeeding said group.

74. A display apparatus according to claim 70, wherein said processing apparatus displays, along with said representative image, frames preceding and succeeding said group.

75. A display apparatus according to claim 70, wherein said representative image is displayed as a solid having a thickness-according to duration of the shots which make up said group.

76. A display apparatus according to claim 70, wherein said representative image is displayed in such a manner that a number of images are stacked in a manner where the images are shifted in position relative to one another according to duration of the shots which make up said group.

77. A display apparatus according to claim 70, wherein said representative image displays along with said representative image duration time information indicating the duration of the shots which make up said group and start time information indicating the start time of the shots which make up said group.

78. A display apparatus according to claim 77, wherein said duration time information and said start time information are provided by one of a clock, frame number or time code.

79. A display apparatus according to claim 70, wherein said displaying is performed using a multi-window function.

80. A display apparatus according to claim 70, wherein said processing apparatus displays in a hierarchical form said representative image and images corresponding to the shots that make up said group.

81. A method of displaying a representative image of a moving image, said moving image includes a plurality of successive frames, and each shot of the moving image includes at least one frame, said method comprising the steps of:

detecting a part of a moving image having a quick change, said part of the moving image includes a plurality of shots, wherein each shot is defined by at least one frame disposed between a first shot change point and a second shot change point, wherein each shot has a duration within a specified range, and wherein said shot change points represent points between a pair of frames where images of a preceding shot and images of a preceding shot have changed; and displaying a representative image corresponding to said part of said moving image.

82. A method of displaying a representative image of a moving image, said moving image includes a plurality of successive frames, and each shot of the moving image includes at least one frame, said method comprising the steps of:

detecting shots having a duration within the specified range that occur repeatedly within a predetermined time period of each other due to frames where there is a quick change, wherein each of said shots are detected by detecting a first shot change point preceding said shot and a second shot change point succeeding said shot, wherein said shot change points represent points between a pair of frames where images of a preceding shot and images of a preceding shot have changed; and displaying a representative image corresponding to detected shots of a moving image.

83. A method of displaying a representative image of a moving image, said moving image includes a plurality of successive frames, and each shot of said moving image includes at least one frame, said method comprising the steps of:

detecting a part of a moving image, said part of said moving image includes a plurality of successive shots, each representative image of a pair of successive shots having more differences with each other than a predetermined level, wherein each shot is defined by at least one frame disposed between a first shot change point and a second shot change point, and wherein said shot change points represent points between a pair of frames where images of a preceding shot and images of a preceding shot have changed;

storing detecting times corresponding to the detected parts of said moving image; and displaying an image from said moving image according to the detecting time as a representative image of said moving image.

84. A display apparatus for displaying a representative image corresponding to at least one shot of a duration within a specified range included in a plurality of shots of a moving image, said moving image includes a plurality of successive frames each having an image, and each shot includes at least one frame, said apparatus comprising:

a display having a display screen for displaying images; and a processing apparatus for detecting a part of a moving image having a quick change where said part of the moving image includes a plurality of shots and each shot has a duration within the specified range, and displaying on said display screen a representative image corresponding to said part of said moving image, wherein each shot is defined by at least one frame disposed between a first shot change point and a second shot change point, and wherein said shot change points represent points between a pair of frames where images of a preceding shot and images of a preceding shot have changed.

85. A display apparatus for displaying a representative image of a moving image, said moving image including a plurality of successive frames, and each shot of the moving image includes at least one frame, said apparatus comprising:

a display having a display screen for displaying images; and a processing apparatus for detecting shots having a duration within a specified range that occur repeatedly within a predetermined time period of each other due to frames where there is a quick change, and displaying on said display screen a representative image corresponding to said group, wherein each of said shots are detected by detecting a first shot change point preceding said shot and a second shot change point succeeding said shot, and wherein said shot change points represent points between a pair of frames where images of a preceding shot and images of a preceding shot have changed.

86. A display apparatus for displaying a representative image corresponding to at least one shot of a duration within a specified range included in a plurality of shots of a moving image, said moving image includes a plurality of successive frames each having an image, and each shot includes at least one frame, said apparatus comprising:

a display having a display screen for displaying images; and a processing apparatus for detecting a part of a moving image where said part includes a plurality of successive shots and each representative image of a pair of successive shots has a greater difference than a predetermined level, storing a detected time indicating detected parts of the moving image and displaying an image from the moving image according to the detected time as a representative image of the moving image, wherein each shot is defined by at least one frame disposed between a first shot change point and a second shot change point, and wherein said shot change points represent points between a pair of frames where images of a preceding shot and images of a preceding shot have changed.

* * * * *